United States Patent [19]

Zinnen et al.

[11] Patent Number: 4,810,266

[45] Date of Patent: Mar. 7, 1989

[54] CARBON DIOXIDE REMOVAL USING AMINATED CARBON MOLECULAR SIEVES

[75] Inventors: Hermann A. Zinnen, Evanston; Anil R. Oroskar, Downers Grove; Chin-Hsiung Chang, Palatine, all of Ill.

[73] Assignee: Allied-Signal Inc., Morristown, N.J.

[21] Appl. No.: 160,442

[22] Filed: Feb. 25, 1988

[51] Int. Cl.$^4$ ............................................. B01D 53/04
[52] U.S. Cl. ............................................ 55/68; 55/75; 55/389; 423/230; 502/437
[58] Field of Search .................... 55/68, 74, 75, 387, 55/389; 423/229, 230; 502/437

[56] References Cited

U.S. PATENT DOCUMENTS

| | | | |
|---|---|---|---|
| 3,491,031 | 11/1966 | Stoneburner | 252/411 |
| 3,639,266 | 2/1972 | Battista | 502/437 X |
| 3,960,768 | 6/1976 | Ripperger et al. | 252/444 |
| 4,046,709 | 9/1977 | Yuki | 252/421 |
| 4,118,341 | 10/1978 | Ishibashi et al. | 502/437 X |
| 4,124,529 | 11/1978 | Jüntgen et al. | 502/437 X |
| 4,320,011 | 8/1980 | Sato et al. | 210/694 |
| 4,420,415 | 12/1983 | Yuki et al. | 502/180 |
| 4,455,444 | 6/1984 | Kulprathipanja et al. | 55/75 X |
| 4,508,851 | 4/1985 | Izumi et al. | 502/437 X |
| 4,526,887 | 7/1985 | Sutt, Jr. | 55/68 X |
| 4,528,281 | 7/1985 | Sutt, Jr. | 423/230 X |
| 4,531,953 | 7/1985 | Groose et al. | 55/74 |
| 4,540,678 | 9/1985 | Sutt, Jr. | 502/5 |
| 4,627,857 | 12/1986 | Sutt, Jr. | 55/70 |
| 4,629,476 | 12/1986 | Sutt, Jr. | 55/68 |
| 4,734,394 | 3/1988 | Kosaka et al. | 55/75 X |

FOREIGN PATENT DOCUMENTS

| | | | |
|---|---|---|---|
| 223574 | 5/1987 | European Pat. Off. | 502/437 |
| 150691 | 12/1975 | Japan | 55/74 |
| 15657 | 2/1980 | Japan | 55/75 |
| 191213 | 11/1982 | Japan | 502/437 |
| 241931 | 11/1985 | Japan | 502/437 |

OTHER PUBLICATIONS

Flanigen, E. M. et al., "Silicalite, A New Hydrophobic Crystalline Silica Molecular Sieve", Nature, vol. 271 Feb. 9, 1978, pp. 512–516.

*Primary Examiner*—Robert Spitzer
*Attorney, Agent, or Firm*—Harold N. Wells; Thomas K. McBride; John F. Spears, Jr.

[57] ABSTRACT

Acid gases such as carbon dioxide are removed from air or other gases using a unique carbon-based material. The material is a carbon molecular sieve prepared from oxygen-free precursors carbonized in the absence of oxygen. The pores of the material are then enlarged as by high temperature steaming. Alcohol amines are then used to impart an amine functionality to the materials. A gas to be treated is contacted with this material at room temperature and atmospheric pressure, with the adsorbed gas being released by heating to a moderate temperature.

24 Claims, No Drawings

CARBON DIOXIDE REMOVAL USING AMINATED CARBON MOLECULAR SIEVES

BACKGROUND OF THE INVENTION

The subject invention relates to a method of removing an acid gas such as carbon dioxide from a vapor or a flowing gas stream. The subject invention is specifically directed to the adsorptive separation of carbon dioxide from air using a carbon molecular sieve-based material which has been functionalized with amine groups.

Porous carbon-based materials have found a broad range of uses as adsorbents for treating various materials and as adsorbents employed in separation processes. This utility has led to a significant amount of activity in developing methods to produce better carbon molecular sieves as represented by the references cited below and the material referred to in these references.

U.S. Pat. Nos. 4,540,678; 4,627,857; and 4,629,476 issued to R. F. Sutt, Jr. are believed relevant for their general teaching in regard to the preparation of carbon molecular sieves. These references describe the preparation of carbon molecular sieves from carbon sources such as coal or coconut char. The references also indicate that it is known to produce the sieves by treating the feed material in a substantially oxygen-free environment during a heating or calcining step. According to these references, the pore distribution may be adjusted through the use of a pore blocking substance such as a large molecular weight hydrocarbon although this material is not employed in all embodiments described in these three references.

U.S. Pat. Nos. 4,046,709 issued to N. Yuki and 4,420,415 issued to N. Yuki et al. are believed relevant as they describe the production of carbon molecular sieves from polymeric precursor materials similar to that which may be employed in the subject invention. These references describe the utilization of a vinylidene chloride copolymer as a precursor material. The copolymer is carbonized for the removal of its hydrogen and chlorine components and the resultant char is pulverized. Sintering agents such as coal tar pitch and binder materials such as cellulose are then added to pulverized product and the mixture is shaped. The thus shaped bound material is then subjected to a high temperature carbonizing treatment to yield the finished material.

U.S. Pat. No. 3,960,768 issued to W. Ripperger et al. is also believed relevant for its teaching in regard to the production of carbon molecular sieves from polymerized halohydrocarbons by the elimination of hydrogen halide during a heating procedure. The reference indicates appropriately shaped end products can be obtained by using raw materials having a corresponding shape. The teaching at column 3 of this reference indicates the preshaped starting materials shrink into the corresponding shapes.

The last cited reference teaches a specific method of heating the polymer in order to avoid the problem associated with the prior methods. More specifically, in the prior methods such as that of U.S. Pat. No. 4,420,415 cited above the polymer would tend to produce a foam-like highly porous carbon upon heating and removal of hydrogen chloride. The resultant material was too soft and porous to be utilized effectively in commercial applications. For this reason, it is necessary to grind the foam-like material to a powder and employ a binder to form articles having a desired finished shape.

There have been references in the literature to carbon molecular sieves which have a hydrophobic nature. For instance, this is described in the article at page 512 of Volume 271 of *Nature* (1978) by E. M. Flannigen et al.

It is known in the art to chemically treat the surface of a carbon-based material to improve its adsorptive capabilities. For instance, U.S. Pat. No. 3,491,031 issued to G. R. Stoneburner describes the preparation and regeneration of activated carbons which are impregnated with monoethanol amine (MEA). These carbons are described as being effective in removing carbon dioxide and other acid gases from ethylene, nitrogen or air. This reference also presents a regeneration method which comprises passing an additional amount of amine vapor across the carbon to prevent amine losses or decomposition during regeneration.

Other references in which an amine is employed to enhance the adsorptive properties of a carbon-based support are U.S. Pat. Nos. 4,320,011 and 4,531,953.

BRIEF SUMMARY OF THE INVENTION

The subject invention provides a secondary amine functionalized carbon molecular sieve material exhibiting excellent selectivity for carbon dioxide over nitrogen and oxygen and a method of using this sieve to remove carbon dioxide from a vapor. The precursor unfunctionalized carbon molecular sieve used in producing the subject adsorbent is highly hydrophobic and therefore its selectivity for $CO_2$ over nitrogen or oxygen remains high despite the presence of high concentrations of water. This hydrophobic nature of the resultant material is believed to be a unique property not present in carbon molecular sieves produced by the prior art methods. The subject material is easily regenerated at moderate temperatures and does not release amine compounds during regeneration.

One broad embodiment of the invention may be characterized as a method of removing an acid gas from a vapor which comprises contacting the vapor at adsorption-promoting conditions with an adsorbent which is manufactured by a method which comprises polymerizing a cross-linking agent and a precursor monomer, with both the cross-linking agent and the monomer being essentially free of molecular oxygen, and producing a cross-linked polymer; shaping a quantity of the polymer into an article having a desired configuration; carbonizing the resultant shaped article in a substantially oxygen-free environment and converting the polymer into carbon molecular sieves; increasing the pore volume of the carbonized article by contact with steam at 600–1000 degrees C.; and, contacting the carbonized article with a dihydric alcohol amine compound.

DETAILED DESCRIPTION

There is a high utility to adsorbents and methods which remove acid gases from vapor streams in an effective and economical manner. Much of this utility relates to the need to remove acid gas from various petroleum processing streams as to remove hydrogen sulfide or carbon dioxide from natural gas or hydrocarbon streams. Although applicable to these situations, the subject invention relates primarily to the removal of acid gases from streams rich in nitrogen and other atmospheric gases such as water and oxygen. These streams will not normally contain any significant quantity of hydrocarbons or sulfurous gases. There is still a high utility for methods of removing acid gases from these specific gases. For instance, it is in some instances desirable to remove carbon dioxide from enclosed spaces such as submarines used in oceanic research or construction, aircraft, spacecraft or enclosed pressurized chambers as may be used for industrial environmental protection or medical life support systems. This desire to remove carbon dioxide from a gas can be due to the dictates of the conditions necessary to perform an industrial or chemical process which requires low levels of carbon dioxide. Therefore, the ability to remove carbon dioxide can be useful in generating high-purity oxygen for use in a chemical reaction or analysis.

In the subject process an acid gas, which is preferably carbon dioxide, is removed from a relatively stagnant or flowing gas stream by contact with a novel functionalized carbon-based material. The preferred feed gas acted upon by the subject process is air or a gas resembling air such as the atmosphere within an enclosed life support system or vehicle.

The ability to regenerate an adsorbent and the ease of its regeneration are also important considerations. The need for extreme conditions such as high temperatures or very low vacuums makes a regeneration more complicated and costly. Th ability to regenerate the adsorbent at a moderate temperature is a significant advantage from a standpoint of safety and utility costs. Regeneration at a low temperature may be accomplished using low level waste heat from another activity while high temperature regeneration will normally require a separate heater. From a health standpoint, the adsorbent must not release noxious or poisonous compounds into the air during use or regeneration. It is also normally desirable to avoid the need for any chemical reagent to effect or promote the regeneration of the adsorbent or to return the adsorbent to its original state of activity. The ease and convenience of the regeneration procedure is especially important in a confined environment such as a spacecraft. In this particular instance, it would be highly undesirable to require a supply of a noxious chemical such as an alcohol amine in order to regenerate a life support system adsorbent. The admixture of any such chemical with the desorbed carbon dioxide may also be a great problem if it is desired to recycle the carbon dioxide by recovery of its oxygen content.

Extensive work has been done to develop useful carbon-based materials having relatively uniform pore size distribution and the required adsorptive surface properties to allow these carbon-based materials to function as carbon molecular sieves (CMS). These materials may be thought of as analogs to the more conventional inorganic molecular sieves and have been found to be selective for the separation of one normally gaseous compound or molecule from another. Typical of the materials which are selectively adsorbed by these materials are carbon dioxide, hydrogen sulfide, and oxygen. The references cited above are indicative of the variety of feed materials, preparation methods, and surface coating methods which have been employed in the art to obtain the desired specific pore structure and surface characteristics which impart either a broad spectrum or selective adsorptive property to the resultant materials.

It is believed, however, that the materials produced according to the methods of the prior art do not exhibit the combination of a hydrophobic character coupled with an adsorption capacity for carbon dioxide plus an acceptable mode of regeneration which would allow these materials to be readily employed as highly efficient means for removing carbon dioxide from a moist gas stream in an enclosed environment. It is also believed that the manufacturing techniques described in the majority of the references hinder the full utilization of the adsorptive capacity of the sieve by leading to an unhomogeneous nature of the resultant finished product and that the manufacturing techniques of the prior art can be improved to reduce the cost of producing the desired material. CMS materials made by prior art methods from waste materials from the manufacture of Saran or other low cost feedstocks have not been optimized for the desired properties of the subject CMS materials. It is an objective of the subject invention to provide a method of removing carbon dioxide from a moist gas stream. It is a further objective of the subject invention to provide an easily regenerable adsorptive method of removing carbon dioxide from a gas.

In the subject invention carbon dioxide is removed from a moist atmosphere by contact at ambient temperature with hydrophobic amine-functionalized carbon molecular sieves (CMS) produced by a unique method of manufacturing. This novel method of manufacturing may be broadly characterized as comprising five steps: (1) polymerization of an oxygen-free monomer in the presence of an oxygen-free cross-linking agent; (2) optionally forming or shaping particles of the resultant polymer into a desired shape; (3) carbonizing the shaped material in a substantially oxygen-free environment; (4) enhancing the pore volume and average diameter of the material as by high temperature steam treatment; and then (5) contacting the carbonized material with an amine compound such as diethanol amine (DEA).

This method of manufacturing therefore comprises the steps of polymerizing a cross-linking agent and a precursor monomer, with both the cross-linking agent and the monomer being essentially free of molecular oxygen, and producing a cross-linked polymer; shaping a quantity of the polymer into an article having a desired configuration without employing a binder material; and, carbonizing the resultant shaped article in a substantially oxygen-free environment into a finished product comprising carbon molecular sieves and having the same overall shape as the uncarbonized article but with reduced dimensions. The carbonized material is then prepared for functionalization by increasing the average pore diameter of the carbonized material which occurs with a significant weight loss to the material. The material is then contacted with an amine compound to functionalize the carbonized material.

During the process of the invention, a gas to be treated is exposed to the material prepared in the above manner. In the second step in the overall process of the invention adsorbed acid gas is driven off of the adsorbent by heating to a mildly elevated temperature of about 50–70 degrees C. for a time period in excess of 15 minutes.

The monomer used to produce the CMS employed in the subject invention can be chosen from a number of different monomers which have general characteristics rendering them suitable for the subject method. Basically, they should be readily polymerizable, essentially free of oxygen in their molecular structure and preferably comprised basically of hydrogen, a halogen, and carbon. Among the materials which may be employed as the monomer are acrylonitrile (AN), vinylidene fluoride (PVDF), chlorotrifluoroethylene (HALAR), vinylidene chloride (PVDC), mixtures of two or more monomers such as mixtures of vinylidene chloride and vinyl chloride, vinylidene chloride and acrylonitrile, and a mixture of styrene and divinylbenzene. Other monomers which are suitable for utilization in the subject invention are vinyl fluoride, vinyl bromide, chlorinated ethylene, chlorofluorinated ethylene, vinylchlorobenzene, vinylidene bromide and vinylidenefluoride-chlorotrifluoroethylene.

The preferred monomer for utilization in the subject invention is vinylidene chloride.

Polymerization reactions may be performed according to a number of different procedures known in the art. However, it has been found that a surprising relationship exists between the method of polymerization employed in the subject process and the adsorptive characteristics of the resultant material. The most favorable results have been obtained employing a bulk polymerization or a solution polymerization.

As used herein the various types of polymerization are defined in accordance with the description found in Volume 16 of the second edition of the *Kirk-Othmer Encyclopedia of Chemical Technology*. Accordingly, a bulk polymerization is the direct conversion of liquid monomer to polymer in a reaction system in which the polymer remains soluble in its own monomer. To deal with the problems of removing the exothermic heat of polymerization this type of polymerization is often terminated at relatively low conversions of 40-60 percent and excess monomer distilled off for use in subsequent polymerization. Solution polymerization is considered herein to be a method wherein a solvent is used which is capable of dissolving the monomer, the polymer, and the polymerization initiator.

Suspension polymerization and emulsion polymerization did not produce marerials having the same level of desired properties and therefore are less preferred methods of polymerization. In suspension polymerization, the monomer is dispersed rather than dissolved in the medium with water being a typical suspension medium. In suspension polymerization, the initiator is dissolved in the monomer, the monomer is dispersed in water, and a dispersing agent is incorporated to stabilize the suspension formed. The monomer droplets are generally on the order of approximately 0.1-1.0 millimeter in size. In emulsion polymerization, the polymerization is within a suspended particle of colloidal size of approximately 50 to 1500 Angstroms in diameter. The initiator is normally found in the aqueous phase and not within the monomer. It is believed that precipitation polymerization and vapor phase polymerization would also be suitable for the subject process.

As observed by reference to Tables 2 and 4 below, the carbon molecular sieves prepared from bulk and solution polymerized precursors were hydrophobic whereas the precursors synthesized with various emulsion and suspension formulations produced carbon molecular sieves with hydrophilic characteristics. It is believed adjustment of the methods used to perform the emulsion and suspension polymerizations may result in the production of hydrophobic molecular sieves. The mechanism which causes the performance of the finished seve to be dependent upon the method of polymerization employed is not understood. However, it is speculated that these differences may result from the inclusion within the polymer and therefore possibly within the finished molecular sieve of remnants of the materials required to form the suspension or added to the suspension for a number of purposes such as surfactants added to aid in the production of a desired emulsion.

The polymers produced in the initial polymerization step should be cross-linked with a substantially oxygen-free cross-linking agent. The cross-linking agent will typically be present during the polymerization at a concentration equal to less than 10 mole percent of the monomer. A preferred cross-linking agent is divinylbenzene. Other cross-linking agents which are contemplated for use in the subject method include trivinyl benzene, divinyl acetylene, and divinyl sulfide.

As the production of carbon molecular sieves from polymers having a non-oxygen functionality is desired, the polymerization initiator is also preferably an oxygen-free compound. Therefore, a carbon or azo compound rather than an oxygen-containing initiator is preferably used. One suitable non-oxygen containing initiator is 2,2'- azobisisobutyronitrile (AIBN) which has a molecular formula of $C_8H_{12}N_4$. Another highly suitable polymerization initiator is the compound 2,2'-azobis(2,4-dimethylvaleronitrile) which is available from DuPont Chemical Company and is sold undrr the trade VAZO 52. The formula of the latter compound is $C_{14}H_{24}N_4$. If the precursor polymer is produced by solution polymerization, a number of different solvents may be employed. Typical solvents include normal hexane, chloroform, carbon tetrachloride, orthodichlorobenzene, and 1,1,2,2-tetrachloroethane. Of these materials, orthodichlorobenzene and 1,1,2,2-tetrachloroethane appear to be preferable as they resulted in higher polymer yields. General characteristics for the selection of a solvent include a high-solubility for the monomer, the absence of oxygen from the molecular structure, and a large difference in boiling point between the solvent and the monomer. A weight ratio between monomer and solvent between 1:1 to 1:2 will normally be suitable.

The material formed by the polymerization may be obtained in a number of different forms such as one or more large masses formed within a reactor or a large number of smaller particles. For ease in fabricating the polymer into a desired shape it is preferably pulverized, shredded, or in some way reduced in size to small free-flowing granules or powder. These granules or even the bulk material resulting from the initial polymerization is then shaped or formed into a desired configuration such as a cylinder, sphere, rod, flat sheet, porous or perforated sheet, extruded honeycomb or monolith, pellets, etc. This shaping or forming may be done by conventional means according to a number of different methods. For instance, the powder may be put into a press and pressurized until it will retain a desired shape. Alternatively and preferably, the resultant material may be warmed and extruded into a desired form, with cylinders having a length to diameter ratio of about 1.0 being a highly preferred form as they most closely simulate a sphere.

The shaped polymeric material is then subjected to a carbonization procedure. This procedure basically consists of heating the shaped material to a high temperature in the presence of an inert gas such as nitrogen or helium. This carbonization is performed in an essentially oxygen-free environment. That is, the concentration of oxygen in the atmosphere surrounding the particles undergoing carbonization should be less than about 0.1 mole percent and is prererably less than 0.05 mole percent. The carbonization will result in the evolution of a hydrogen halide. Preferably flowing inert gas is used at a sufficient rate to remove this material from the particles. However, it has been found that the removal of the hydrogen halide is not necessary to the production of suitable finished material by the subject method.

It is preferred that prior to high temperature carbonization the shaped polymer precursor material is subjected to a mild heating step during which its temperature is raised above 150° C. and preferably above 240° C., and that the pellet is held at this temperature until no more weight loss occurs. The pellets or other form of shaped material is then preferably subjected to a programmed temperature increase to a temperature above 700° Celsius and preferably above 800° Celsius. A temperature of or above 900° Celsius is highly preferred. The temperature of the shaped precursor material is preferably raised at a rate greater than 50° Celsius degrees per hour but less than 200° Celsius degrees per hour. Also, it is preferred to hold the shaped material at the final high temperature, such as 800 degrees, for a period of at least 45 minutes and preferably for at least one hour. A preferred rate of programmed heating is a heat increase rate of 75°–125° Celsius degrees per hour. The highest temperature is normally required for less than 5 hours. The required holding period can be determined by weight loss measurements.

If no specific shape is desired, the shaping step may be deleted and particles of a desired size may be carbonized. Alternatively, large masses of polymer may be carbonized and then crushed and sized, as with screens, although this procedure generally results in the production of considerable waste in the form of off-size particles.

One characteristic of the subject method is that it requires only a single carbonization step. That is, the second carbonization step of some prior art methods is not required. A second carbonization step is routinely used in most prior art methods after the product of the first carbonization has been pulverized, admixed with a binder or other material such as coal tar pitch or other heavy high carbon content material and then shaped. The second carbonization basically acts upon the binder material.

Another characteristic feature of the adsorbent used in the subject process is that the sieve precursors are derived from polymeric materials which are substantially free of the inorganic materials such as metals and inorganic oxides which may be present when the precursor material is made from a naturally occurring substance such as coal, coconut shells, peat, or wood. Materials which also contain a binder prior to carbonization will normally have impurities derived from the binder in addition to impurities present in the precursor materials. After carbonization the subject materials, on an hydrogen- and oxygen-free basis, should contain at least 99.5 wt. % carbon and preferably at least 99.8 wt. % carbon. This measurement does not include any material applied as a surface treatment or coating.

A shaped mass of polymeric material will shrink during the carbonization step. It has been found that the shaped material will tend to shrink in a proportional manner along each dimension. The amount of shrinkage is also proportional to the amount of weight loss caused by the driving off of the hydrogen halide from the shaped polymer. The shaped pellet will lose approximately 70 percent of its weight and size during the carbonization procedure due to the evolution of hydrogen chloride, hydrogen bromide, or hydrogen fluoride or a mixture of these gases. A minimum weight loss of about 60 percent is desirable for the preferred polymer. As shown in the tables herein, the final carbonized material will often equal about 27 to 28 weight percent of the initial or starting polymerized material. Table 1 gives detailed data on the weight decrease experienced by a number of different samples. The optimum weight loss for other polymers may vary with the concentration of the halogen and the identity of the halogen. Higher molecular weight halogens result in a proportionally higher weight loss.

It is interesting to note that the density of the initial material and the final carbonized material are very similar. That is, the density measured in terms of grams per milliliter of the finished carbon molecular sieves is normally within 0.05 grams per milliliter of the density of the initial uncarbonized polymer. Samples A-1 through C-4 were from a bulk polymerization, with the uncarbonized pellets of samples A-1 to B-6 having a diameter of 0.64 cm (0.25 in) prior to carbonization. The pellets of sample group C had an initial diameter of 0.32 cm. The precursor powder used to form the pellets was ball-milled for 3 hours for samples A-1 to A-4, while the powder used to produce samples B-1 to B-6 were ground in an electric blender. It is not necessary to apply a surface coating or additive to the carbonized material for the purpose of adjusting pore opening sizes or shapes either before or after the carbonization step.

TABLE 1

CARBONIZATION OF PVDC-DVB PELLETS AT 900 C.

| Sample Number | STARTING PELLETS | | FINAL CMS PELLETS | | |
|---|---|---|---|---|---|
| | Wt (g) | Density (g/mL) | Wt (g) | Density (g/ML) | Yield (%) |
| A-1 | .1659 | 0.953 | .0457 | 0.952 | 27.5 |
| A-2 | .1686 | 0.953 | .0466 | 0.951 | 27.6 |
| A-3 | .1710 | 0.983 | .0473 | 0.965 | 27.7 |
| A-4 | .1330 | 0.964 | .0366 | 1.017 | 27.5 |
| B-1 | .1426 | 0.779 | .0386 | 0.757 | 27.1 |
| B-2 | .1358 | 0.813 | .0368 | 0.767 | 27.1 |
| B-3 | .1242 | 0.839 | .0337 | 0.864 | 27.1 |
| B-4 | .1441 | 0.787 | .0391 | 0.782 | 27.1 |
| B-5 | .1493 | 0.816 | .0403 | 0.822 | 27.0 |
| B-6 | .1312 | 0.754 | .0355 | 0.740 | 27.1 |
| C-1 | .0377 | 0.820 | .0100 | 0.769 | 26.5 |
| C-2 | .0348 | 0.829 | .0093 | 0.715 | 26.7 |
| C-3 | .0364 | 0.791 | .0096 | 0.800 | 26.4 |
| C-4 | .0365 | 0.830 | .0097 | 0.808 | 26.6 |

EXAMPLE 1

This example illustrates the production of unfunctionalized CMS pellets beginning with the bulk polymerization of a cross-linked polyvinylidene chloride. The reagents utilized in the polymerization were purified by contact with activated carbon (Calgon PCB, 20×50 mesh) at the ratio of 2 grams activated carbon per 100 milliliter of the monomer and the divinyl benzene. The purpose of this purification is the removal of any polymerization inhibitors present in the monomer or cross-linking agent. 0.1 gram of AIBN solids were introduced into a Teflon-lined reactor, which was a 125 milliliter Parr bomb. 82.4 milliliters of vinylidene chloride monomer and 1 milliliter divinylbenzene were transferred into the reactor and the reactor was sealed and shaken. The reactor was then kept in an oven at 70° Celsius for a period of at least 8 hours. At the end of this time, the reactor was opened in a hood and the polymer products were collected and weighed. The yield of polymerization reaction product was determined after the polymer was evacuated in the hood until a constant weight was obtained. All of the results listed herein as being from a bulk polymerization are based on the utilization of this general procedure for the polymerization step. The only variations would be in the monomer, or cross-linking agent employed, the composition of the initiator, or the purification of the reactants with a carbon column of about 1.5 centimeters diameter packed with 8 grams of adsorbent.

The polymer produced in this manner was then pulverized with an electric blender. Pellets of 3.2, 4.2, and 6.4 millimeter diameters were made with a handpress.

After being shaped by the pelletization procedure, the pellets were carbonized in a rotating reactor with a programmed heating rate. The pellet(s) to be carbonized was heated in a one-inch diameter quartz tube placed in a tube furnace. A steady stream of inert gas was introduced into the quartz tube for at least 30 minutes prior to the heating of the furnace. The temperature of the furnace was increased at a constant rate from room temperature to final temperature. A heating rate of 110 Celsius degrees per hour was used with the final temperature of 900 degrees Celsius being held for one and one-half hours before the product was allowed to cool to room temperature. It is believed important that the dry inert gas which flows through the furnace during carbonization or that the atmosphere sealed into the furnace during carbonization is essentially free of oxygen. The inert gas may be nitrogen or helium. The amount of cross-linking material present was 0.9 and 0.5 weight percent in various tests. The finished carbon molecular sieves produced at these two levels were quite similar, and a DVB level of 0.5 weight percent was adopted as a standard.

EXAMPLE 2

This example illustrates the preparation of the polymer using solution polymerization. A 125 milliliter Parr bomb as described in the previous example was used. The total volume of reagents in the reactor was maintained at about 85 milliliters. The rtio of vinylidene to solvent was maintained at 1:1.5 with the solvent being orthodichlorobenzene. The reactor was held at 70° Celsius for 21 hours. A polymer yield of 50.9 weight percent was obtained, with the solvent being removed from the polymer products by a vacuum ($10^{-3}$ mm mercury) until a constant weight was obtained. The material was then pulverized, shaped and carbonized as described in Example 1. Prior polymerizations with n-hexane, chloroform and carbon tetrachloride yielded 7.2, 14.2 and 19.6 wt. % yields respectively.

A second solution polymerization was performed using 1,1,2,2-tetrachloroethane at a ratio of vinylidene chloride to solvent of 1:2. The reaction was continued for 16 hours at a temperature of 70°. The polymer yield was approximately 47.9 weight percent. This material is characterized in the accompanying tables as sample 3. The same general procedure used in the Example 1 for the purification of the monomer and cross-linking agent were followed for the solution polymerization trials.

EXAMPLE 3

Polymeric materials were produced using emulsion polymerization techniques. In this test run, 43.7 grams of vinylidene chloride was admixed with 0.9 g of divinylbenzene cross-linking agent. Both of these materials had been purified as previously described. This admixture was added to 137.8 g of a mixture containing 1.35 g of ammonium sulfate, 0.67 g of hydrazine sulfate, 0.81 g of sodium hydroxide and 135 g of distilled water which formed the continuous phase during the polymerization. 0.45 g of sodium lauryl sulfate was added to aid in formation of the emulsion. This admixture was maintained in a rapidly agitated 500 milliliter reactor maintained at a temperature of 25 degrees Celsius for 24 hours. The polymeric material was pulverized, pressed into pellets and carbonized in accordance with procedure described for Example 1. The material produced in this manner comprises the sample labeled as sample number 5 in the tables.

The above examples are not intended to present the only methods of preparing material which may be used in the subject process or to otherwise limit the scope of the invention. The examples are intended to aid in describing and facilitating the practice of various embodiments of the invention.

EXAMPLE 4

The CMS material used in the subject process is believed to have a number of unique adsorptive properties. The following examples are presented to illustrate these properties and to help characterize the preferred CMS material. The static equilibrium capacity for carbon dioxide adsorption of the unfunctionalized carbon molecular sieves produced in the Examples above was determined by weight difference at room temperature. The weight measurements were made using a gravimetric McBain balance. This system consists of a quartz spiral spring, a gas supply system, and a high vacuum system. The spring is contained in a quartz tube with the carbon molecular sieves contained in a quartz basket hung from the end of the spring. The extension of the spring could be measured to plus or minus 0.05 millimeters. About 100 milligrams of finished carbon molecular sieves were evacuated and heated to 200° Celsius for a period of more than one hour until a constant weight was obtained. During this time the pressure of the balance system was monitored. The adsorption measurement was carried out after the adsorbent and the quartz tube were cooled to room temperature under vacuum. Air was then introduced into the absorption chamber, with the air having been adjusted to contain $CO_2$ at 0.4 or 0.5 mole percent concentrations. Dry air was utilized in this experiment.

Data obtained in this manner is listed in Table 3. As may be seen by reference to the table, the $CO_2$ adsorption capacity of the different carbon molecular sieves is quite similar although the materials prepared by the bulk polymerization have a higher capacity than those prepared by solution or emulsion polymerization methods.

TABLE 2

| | GAS-SOLID CHROMATOGRAPHIC EVALUATION OF CARBON MOLECULAR SIEVES | | | |
|---|---|---|---|---|
| Sample No. | Polymerization Method | Pellet Density (g/mL) Before | Pellet Density (g/mL) After | Carbon Yield (%) | Column Packing Density (g/mL) |
| 1 | Bulk | 0.80 | 0.78 | 27.0 | 0.48 |
| 2 | Bulk | — | — | — | 0.43 |
| 3 | Solution | 0.62 | 0.90 | 26.6 | 0.45 |
| 4 | Solution | — | — | — | 0.40 |
| 5 | Emulsion | 0.75 | 1.00 | 26.5 | 0.49 |
| 6 | Emulsion | — | 0.91 | 24.4 | 0.56 |
| 7 | Emulsion | 1.05 | 0.99 | 26.7 | 0.36 |
| 8 | Emulsion | 0.88 | 0.36 | 28.2 | 0.19 |
| 9 | Emulsion | 0.65 | 0.31 | 28.3 | 0.21 |

TABLE 2-continued

GAS-SOLID CHROMATOGRAPHIC EVALUATION OF CARBON MOLECULAR SIEVES

| Sample No. | Polymerization Method | Pellet Density (g/mL) Before | Pellet Density (g/mL) After | Carbon Yield (%) | Column Packing Density (g/mL) |
|---|---|---|---|---|---|
| 10 | Emulsion | — | — | 11.3 | 0.35 |
| 11 | Emulsion | 0.67 | 0.96 | 26.0 | 0.31 |
| 12 | Emulsion | — | — | 26.7 | 0.50 |
| 13 | Suspension | — | — | 26.4 | 0.54 |
| 14 | — | — | — | — | 0.63 |

TABLE 3

| Sample No. | Pellet Diameter (cm) | Preparation Method | Bulk Density (g/mL) | Carbon Yield (%) | $CO_2$* Capacity (g/g) |
|---|---|---|---|---|---|
| 15 | 0.42 | Bulk | 0.60 | 26.4 | 0.0246 |
| 16 | 0.21 | Bulk | 0.77 | 26.6 | 0.0259 |
| 17 | 0.42 | Solution | 0.65 | 23.4 | 0.0234 |
| 3 | 0.19 | Solution | 0.90 | 26.6 | 0.0236 |
| 18 | 0.42 | Emulsion | 0.75 | 25.6 | 0.0217 |
| 5 | 0.37 | Emulsion | 1.00 | 26.5 | 0.0223 |

*Data taken with 0.4% $CO_2$ in air at room temperature.

EXAMPLE 5

The selectivity of the unfunctionalized carbon molecular sieves for carbon dioxide as compared to nitrogen or oxygen and the hydrophobicity of the carbon molecular sieves was studied with a gas-solid chromatographic method. A Hewlett-Packard Model 5890A gas chromatographic unit equipped with a thermal conductivity detector was employed. The column of the chromatographic unit was a stainless steel tube with a 1.5 millimeter ID having an adsorbent volume of 1.5 milliliter. Pellets of the finished carbon molecular sieves were sized to 0.21–0.42 millimeter in diameter. These small particles were then packed into the column. The column temperature was controlled by an oven.

During the test helium is introduced into the column continuously at a flowrate of 20.0 milliliters per minute. This flowrate corresponds to a gas hourly space velocity of approximately 800. After the system has been lined out and a constant baseline signal is achieved at the detector, a known volume of a sample gas is introduced. The volume was controlled by a sampling valve on the chromatographic unit or by a precision gas syringe. The volume of the $CO_2$ gas mixture injected was 0.1 milliliter. The sample gas was followed by a continuous flow of helium.

During passage through the adsorption column, the various components of a gas (nitrogen, oxygen or carbon dioxide) will distribute themselves between the adsorbent phase and the gas phase. The more strongly adsorbed material would tend to move towards the exit of the column at a slower rate than a less strongly adsorbed component. By detecting the signals corresponding to the various components as they exit the column, the selectivity of the particular carbon molecular sieve may be monitored.

The selectivity of the unfunctionalized carbon molecular sieve for carbon dioxide over moisture was determined by measuring the retention time of water under smmilar conditions as used for carbon dioxide. Therefore, a small quantity of water is injected into the carrier gas and the retention time was compared to that of carbon dioxide in a nitrogen/oxygen mixture. Referring now to Table 4, it may be seen that for sample number 1 the retention time for carbon dioxide was 2.88 minutes while the retention time under the same chromatographic conditions for water was 1.95 minutes. These results indicate that the carbon molecular sieve of sample number 1 is selective for carbon dioxide over water. That is, it is hydrophobic under these conditions. It may be seen that the samples 1–4 prepared by bulk and solution polymerization have ratios of carbon dioxide to water retention times greater than one.

The unfunctionalized carbon molecular sieves prepared by emulsion and suspension polymerization techniques (samples 5–13) are shown to be hydrophilic. That is, these materials preferred to retain water over carbon dioxide. The material labeled as sample 14 is a commercially available carbon molecular sieve marketed by Alltech under the tradename Carbosiev S-II.

TABLE 4

| Sample No. | Retention Time (at 110° C.) | | | |
|---|---|---|---|---|
| | $N_2$ | $CO_2$ | $H_2O$ | $CO_2/H_2O$ |
| 1 | 0.56 | 2.88 | 1.95 | 1.67 |
| 2 | 0.32 | 1.71 | 1.20 | 1.58 |
| 3 | 0.39 | 2.12 | 1.61 | 1.42 |
| 4 | 0.39 | 2.05 | 1.27 | 1.88 |
| 5 | 0.39 | 2.17 | 3.77 | 0.51 |
| 6 | 0.52 | 3.02 | 6.21 | 0.44 |
| 7 | 0.34 | 1.60 | 2.60 | 0.56 |
| 8 | 0.37 | 1.27 | 15.10 | 0.06 |
| 9 | 0.27 | 1.80* | 7.10* | 0.22 |
| 10 | 0.32 | 1.80* | 6.20* | 0.25 |
| 11 | 0.39 | 1.69 | 2.21 | 0.71 |
| 12 | 0.37 | 2.22 | 4.05 | 0.50 |
| 13 | 0.31** | 1.32** | 7.0** | 0.15 |
| 14 | 0.31 | 1.30 | 6.50 | 0.16 |

*Broad peaks.
**Data taken at 140° C.

The unfunctionalized carbon molecular sieve material produced by the subject method would normally have a finished, that is after carbonization, density ranging from 0.7 to 1.05 grams per milliliter. This is the piece density or the density of the solid material. The column packing density or the density at which the material may be packed into an adsorptive chamber will be dependent upon the shape of the finished molecular sieve particle. The column packing density for pellets having a cylindrical shape will normally be between 0.3 and 0.6 grams per milliliter. The carbon molecular sieves produced by the subject method are expected to generally have physical characteristics similar to that of the prior art carbon molecular sieves. The average pore volume is expected to be between 0.4 and 0.8 cc per gram. Based on comparison tests using different size adsorbed species, it appears the average pore opening for carbon molecular sieves is on the order of 5 Angstroms. The subject materials have an average surface area of about 1000 to 1700 $m^2$ per gram as measured by a BET method. Although the materials made by the subject method may have physical characteristics similar to those materials made by prior art methods, it is believed they have unique chemical surface or adsorptive properties. These unique properties include an ability to selectively retain carbon dioxide in preference to water thereby allowing the removal of carbon dioxide from a water-containing stream of gas such as air.

The materials of the subject invention may be utilized for the treatment of air in a number of enclosed environments or vehicles. Specifically, the subject material is expected to find great utility in the removal of carbon dioxide from breathing air. It may be employed in an airplane or other vehicle to maintain a low level of carbon dioxide or to capture carbon dioxide for further processing. The hydrophobic nature of the sieve prepared according to the subject invention allows this carbon dioxide removal to be achieved without the prior passage of the air being treated through a bed of material or other system for the removal of normally expected amounts of water vapor. Carbon dioxide removal from air may be accomplished by passing the air at a slight pressure or at an ambient pressure through an active bed of the subject material maintained at adsorption-promoting conditions. Two or more beds may be employed on a swing bed system to provide continuous removal of carbon dioxide. The adsorbed carbon dioxide may then be recovered from the subject carbon molecular sieves by conventional means such as by depressurization, heating, or a combination of these two methods which regenerates the material and returns it to an active or unsaturated form.

The carbonized material is converted into a finished adsorbent by two subsequent steps. First, the raw carbonized material is treated to open its pore structure. This increases the size of the openings into the micropores where most of the surface area of the adsorbent resides and may enlarge the diameter of a significant percentage of the pores. After the raw carbonized material is treated to open its pore structure it is then "functionalized" by contact with an amine compound.

The first treating step can be performed in any desired manner. It is preferably performed by contacting the carbonized material with steam at a high temperature. This can be performed immediately following the end of the carbonization step without any intermediate cooling or handling of the material. Alternatively the material can be cooled after carbonization and then subjected to a high temperature steaming. The pore opening treating step may be characterized by the weight loss of the material during the treating step. This should be at least 25 wt. percent, but less than 75 wt. percent. Excessive weight loss, which occurs by the removal of carbon, leads to destruction of the structure of the carbon skeleton particle and its collapse into finer particles or powder.

The pore opening step preferably comprises contacting the carbonized material with high temperature steam. Steam of a temperature of from about 600 to 1000 degrees C. may be used, with a temperature of 750 to 950 degrees C. being preferred. The time of contact is important. A general range of contact times is from 10 minutes to 3 hours. The optimum contact time will be determined at least in part by the time during which the carbonized material is in contact with the steam and its temperature. A preferred range of times is from 50 minutes to 1.5 hours. Excellent results have been obtained using 850 degrees C. steam for 1 hour. The desired amount of steaming can be monitored on the basis of the weight lost during steaming as described above. Preferably the carbonized material loses an additional 40–65 percent of its weight during contact with the steam, with 50–60 percent weight loss being highly preferred. Contact with the steam may be while the carbon material is held in a stagnant mass of steam, although it is preferred that the steam flows through the bed of carbonized material at a flow rate greater than an 1.0 hr$^{-1}$ liquid hourly space velocity to ensure uniform temperature and contacting.

After being treated to increase pore diameters, the carbonized material is then contacted with an amine compound under conditions which result in the attachment of amine functional groups on the inner surface of the pores of the carbonized material. The product of this step is the end product of the preparation method and is referred to herein as a functionalized carbon molecular sieve or functionalized carbon adsorbent. Any suitable amine compound or compounds which result(s) in the placement of the amine compound on the carbon can be employed. Contemplated agents include methylamine, ethyl amine, isopropylamine, dipropylamine and phenylene-diamine or mixtures of these compounds. The preferred functionalization agents are mono or dihydric amino alcohols including mono or diethanolamine (MEA or DEA), isopropanolamine, methanolamine, diisopropanolamine, or a trihydric amino alcohol such as triethanol amine, methyldiethylanolamine, etc.

It is believed that tertiary amines are not best for use in the subject process as it is believed that the linkage of the amine to the carbon is via the nitrogen atom. Secondary amines are preferred. The preferred alcohol amine is diethanol amine. This compound has been found to provide capacity less than that of monoethanol amine, but more importantly a material produced using diethanol amine is stable during regeneration while a material produced in the same manner using monoethanol amine is not stable. With a monoethanol amine derived material, the capacity or activity of the material began to decrease after only three regenerations.

It is postulated that the surprisingly better performance of the diethanol amine derived material is due to the product carbamate formed by the amine function—carbon dioxide bond having a lower stability constant. That is, the product of the $>$NCOO$^-$ interaction is more stable in a monoethanol amine derived material. A higher temperature is required for regeneration and this higher temperature leads to loss of the amine functionality.

Loss of capacity is normally undesirable for any desorbent. It is especially undesirable if the adsorbent is intended for long term use in an enclosed environment or releases amines into the product or regeneration gases.

The functionalization agent can be applied by a number of methods such as by immersing the carbonized material in a liquid or by exposure to a mist or vapor. The preferred method is to expose an agitated mass, that is a mass of particles being stirred or tumbled, to a mist of the agent being continuously sprayed through a nozzle or other means of generating very fine droplets which fall or impact on the carbonized material. This mode of contacting can be performed at ambient (normal room) conditions of temperature and pressure.

The amount of amine functionalization agent added to the support should be equal to from about 20 to about 65 weight percent of the finished adsorbent. A preferred range of addition is from about 40 to about 60 weight percent. High loadings and the necessary uniform distribution of the amine functional groups results in part from the previous pore enlargement step.

The amine compound will be attached to the prepared carbonized support. This attachment may be by simple adsorption and is not necessarily the result of any chemical reaction. That is, the amine functional group may be part of the alcohol amine held on the carbon by physical bonding rather than chemical bonding.

Table 5 presents $CO_2$ adsorption isotherms for the subject functionalized adsorbent. This material was produced from a carbonized bulk polymerized vinylidene chloride polymer subjected to a steam pore enhancement procedure which caused an approximate 55 percent weight loss followed by functionalization with diethanol amine which resulted in about a 50 wt. percent gain in the adsorbent particles. The adsorbent particles were small cylindrical pieces. The table indicates the equilibrium capacity of the material for carbon dioxide in weight percent of the adsorbent at the temperature and total $CO_2$ pressures indicated.

TABLE 5

$CO_2$ ADSORPTION ISOTHERMS OF FUNCTIONALIZED CARBON MOLECULAR SIEVE ADSORBENTS*

| 13.5° C. | | 23.0° C. | | 75.0° C. | |
|---|---|---|---|---|---|
| P** | Capacity | P | Capacity | P | Capacity |
| 1.7 | 3.32 | 2.0 | 2.22 | 2.3 | 0 |
| 4.0 | 4.06 | 3.8 | 3.04 | 3.8 | 0.12 |
| 9.6 | 4.68 | 8.1 | 4.02 | 7.8 | 0.55 |
| 42 | 6.28 | 41 | 5.96 | 36 | 3.46 |
| 76 | 6.40 | 76 | 6.09 | 76 | 3.83 |
| 380 | 6.52 | 380 | 6.45 | 380 | 4.82 |

*Dried at 75° C. for 2 hours
**$CO_2$ partial pressure (mmHg)

The two primary embodiments of the invention are a unique adsorbent composition and the use of that composition in the removal of acid gases, preferably carbon dioxide from a vapor. A preferred embodiment of the latter embodiment may be characterized as a method of removing carbon dioxide from a gas comprising water, nitrogen and oxygen which comprises contacting the gas at adsorption promoting conditions with a shaped product comprising a homogeneous molecular sieve material which is made by a series of steps which comprises performing a bulk polymerization of an oxygen-free monomer in the presence of an oxygen-free cross-linking agent, and producing free flow granules of a cross-linked polymer; producing shaped articles from the granules without the use of a binder material; carbonizing the resultant shaped articles in a substantially oxygen-free environment in the presence of an inert gas; reducing the mass of the shaped articles by 25-75 wt. % by contact with steam at an elevated temperature; and contacting the carbonized articles with a dihydric alcohol amine compound under conditions which result in the shaped product containing from about 20 to about 65 weight percent dihydric alcohol amine.

EXAMPLE 6

The material described in reference to Table 5 was tested for breakthrough capacity for carbon dioxide adsorption at different carbon dioxide concentrations and temperatures under both moist and dry conditions. This capacity is important as it represents that which can be achieved in a flowing (nonequilibrium) condition during actual use in a system in which beds of adsorbent are being cycled between adsorption and regeneration.

The subject material is effective in both moist and dry gases. It is believed that the presence of moisture is beneficial to the long term stability of the subject material as the carbon dioxide retaining complex is believed to require the presence of a water molecule.

TABLE 6

Breakthrough Study on CMS for $CO_2$ Removal

| $CO_2$ Conc. (%) | Relative Humidity | Adsorption Temp. (°C.) | $CO_2$ Breakthrough Capacity* (%, g/g) |
|---|---|---|---|
| 0.389 | dry | 23-25 | 3.35 |
| 0.389 | 80% | 24-28 | 3.38 |
| 0.389 | dry | 8.5-10.4 | 4.10 |
| 0.389 | 80% | 9.0-10.5 | 3.84 |
| 1.008 | dry | 24-27 | 4.18 |
| 1.008 | 80% | 23-28 | 4.22 |
| 1.008 | dry | 8.4-11.8 | 4.02 |
| 1.008 | 80% | 8.4-11.1 | 4.14 |

*At 50% breakthrough.

EXAMPLE 7

This example illustrates the ability of the subject adsorbent to purify breathing air used in a confined system on a continuous basis. In a first trial, particles of an adsorbent similar to that described above in regards to Tables 5 and 6 were used to treat laboratory air for 35 cycles of adsorption/regeneration. Adsorption was performed at ambient conditions (21.2 degrees C., atmospheric pressure). Desorption was done by heating the loaded adsorbent particles to 72 degrees C. and flushing the adsorbent chamber with nitrogen as a purge media. The composition of the effluent of the adsorption cycle was monitored to observe carbon dioxide removal. The system was tested in this manner with no noticeable degradation.

Similar adsorbent material was then tested in a full scale system designed to simulate the removal of carbon dioxide as part of an air purification system of a manned spacecraft. The system was used with a one hour total cycle time—30 minutes of adsorption and 30 minutes for regeneration. The regeneration was performed using electrical heating with a regeneration temperature of 70 degrees C. being employed. Adsorption was again at ambient temperature. Both adsorption and regeneration also were performed at ambient atmospheric pressure.

After 300 hours of continuous operation, the adsorbent was performing without noticeable degradation to its high adsorption capacity. More importantly, regeneration was possible at mild temperatures without the need for any chemical reagents such as additional functionalization agent in contradistinction to the material of previously cited U.S. Pat. No. 3,491,031. Also very important was the apparent lack of any release of functionalization agent by the adsorbent during regeneration or use. The subject invention therefore provides a safe and very effective system for the long term removal of carbon dioxide without the use or release of any possibly harmful chemicals.

What is claimed:

1. A method of removing an acid gas from a vapor which comprises contacting the vapor and adsorbing at an acid gas adsorption-promoting conditions with an adsorbent which is manufactured by a method which comprises:
   (a) polymerizing a cross-linking agent and a precursor monomer, with both the cross-linking agent and the monomer being essentially free of molecular oxygen, and producing a cross-linked polymer;
   (b) shaping a quantity of the polymer into an article having a desired configuration;

(c) carbonizing the resultant shaped article in a substantially oxygen-free environment and converting polymer into carbon molecular sieves;

(d) increasing the pore volume of the carbonized article by contact with steam at 600–1000 degrees C.; and, (e) contacting the carbonized article with a dihydric alcohol amine compound.

2. The method of claim 1 further characterized in that a bulk or solution method of polymerization is employed in the cross-linking step.

3. The method of claim 1 further characterized in that the carbonization step is performed in the substantial absence of oxygen.

4. The method of claim 3 further characterized in that the monomer is a vinyl chloride monomer.

5. The method of claim 4 further characterized in that divinyl benzene is employed as the cross-linking agent.

6. The method of claim 3 further characterized in that the monomer is vinylidene chloride.

7. The method of claim 3 further characterized in that the shaped article is held at a temperature above 800 degrees C. for at least one hour during the carbonization step.

8. The method of claim 7 further characterized in that the weight of the article is reduced by at least 60 percent during the carbonization step.

9. The method of claim 8 further characterized in that the weight of the article is reduced by at least an additional 20 percent during step (d).

10. The method of claim 9 further characterized in that the amine compound is a diethanol amine.

11. The method of claim 10 further characterized in that the acid gas is carbon dioxide.

12. The method of claim 1 further characterized in that the acid gas is carbon dioxide.

13. A method of removing carbon dioxide from a gas comprising water, nitrogen and oxygen which comprises contacting the gas and adsorbing carbon dioxide at adsorption promoting conditions with a shaped product comprising a homogeneous molecular sieve material which is made by a series of steps which comprises:

(a) performing a bulk polymerization of an oxygen-free monomer in the presence of an oxygen-free cross-linking agent, and producing free flow granules of a cross-linked polymer;

(b) producing shaped articles from the granules without the use of a binder material;

(c) carbonizing the resultant shaped articles in a substantially oxygen-free environment in the presence of an inert gas;

(d) reducing the mass of the shaped articles by 25–75 wt. % by contact with steam at an elevated temperature; and, (e) contacting the carbonized articles with a mono or dihydric alcohol amine compound under conditions which result in the shaped product containing from about 20 to about 65 weight percent dihydric alcohol amine.

14. The method of claim 13 further characterized in that the monomer is vinylidene chloride.

15. The method of claim 13 further characterized in that the shaped articles are held at a temperature above 800 degrees C. for at least one hour during the carbonization step.

16. The method of claim 13 further characterized in that the dihydric alcohol amine compound is diethanol amine.

17. An adsorbent comprising a secondary amine functionalized carbon support, which carbon support is produced by a series of steps comprising:

(a) performing a polymerization of a monomer in the presence of a cross-linking agent, and producing free flowing granules of a substantially oxygen-free cross-linked polymer;

(b) producing shaped articles from the granules without the use of a binder material;

(c) carbonizing the resultant shaped articles in a substantially oxygen-free environment in the presence of an inert gas;

(d) reducing the mass of the shaped articles by 25–75 wt. % by contact with steam at an elevated temperature; and, (e) contacting the shaped particles with a secondary amine under conditions which produce the functionalized carbon support.

18. The adsorbent of claim 17 further characterized in that the shaped articles are held at a temperature above 800 degrees C. for at least one hour during the carbonization step.

19. The adsorbent of claim 18 further characterized in that the mass of the shaped articles is reduced by contact with steam at a temperature of about 750–950 degrees C. for from 10 minutes to 3 hours.

20. The adsorbent of claim 19 further characterized in that the monomer is polymerized via a bulk polymerization.

21. The adsorbent of claim 20 further characterized in that the monomer is a vinyl chloride monomer, and the carbon support is functionalized by contact with a dihydric alcohol amine.

22. The adsorbent of claim 17 further characterized in that the carbon support is functionalized by contact with diethanol amine.

23. The adsorbent of claim 17 further characterized in that the adsorbent contains from about 20 to about 65 weight percent of a dihydric alcohol amine.

24. The adsorbent of claim 23 further characterized in that the adsorbent contains about 40 to about 60 weight percent diethanol amine.

* * * * *